United States Patent
Lim

(10) Patent No.: US 6,574,378 B1
(45) Date of Patent: Jun. 3, 2003

(54) METHOD AND APPARATUS FOR INDEXING AND RETRIEVING IMAGES USING VISUAL KEYWORDS

(75) Inventor: Joo Hwee Lim, Singapore (SG)

(73) Assignee: Kent Ridge Digital Labs, Singapore (SG)

( * ) Notice: Subject to any disclaimer, the term of this patent is extended or adjusted under 35 U.S.C. 154(b) by 0 days.

(21) Appl. No.: 09/341,348

(22) PCT Filed: Jan. 22, 1999

(86) PCT No.: PCT/SG99/00001

§ 371 (c)(1),
(2), (4) Date: Jul. 8, 1999

(87) PCT Pub. No.: WO00/43910

PCT Pub. Date: Jul. 27, 2000

(51) Int. Cl.⁷ .................................................. G06K 9/54
(52) U.S. Cl. ...................................... 382/305; 358/403
(58) Field of Search ................................. 382/305, 306, 382/155, 156, 160, 224, 225, 226; 707/3, 102; 358/403

(56) References Cited

U.S. PATENT DOCUMENTS

| | | | |
|---|---|---|---|
| 4,839,853 A | 6/1989 | Deerwester et al. | 364/900 |
| 4,839,859 A | 6/1989 | Deerwester et al. | 364/900 |
| 4,944,023 A | 7/1990 | Imao et al. | 382/37 |
| 5,226,175 A | 7/1993 | Deutsch et al. | 395/119 |
| 5,655,117 A | 8/1997 | Goldberg et al. | 395/613 |
| 5,710,877 A | 1/1998 | Marimont et al. | 395/427 |
| 5,751,286 A | 5/1998 | Barber et al. | 345/348 |
| 5,751,852 A | 5/1998 | Marimont et al. | 382/180 |
| 5,781,899 A | 7/1998 | Hirata | 707/6 |
| 5,802,361 A | 9/1998 | Wang et al. | 395/600 |
| 5,819,288 A | 10/1998 | De Bonet | 707/104 |
| 5,845,009 A | 12/1998 | Marks et al. | 382/228 |
| 5,878,425 A * | 3/1999 | Redpath | 707/102 |
| 5,911,139 A * | 6/1999 | Jain et al. | 707/3 |

OTHER PUBLICATIONS

Arbib, M.A.(Ed.), The Handbook of Brain Theory and Neural Networks, The MIT Press, (1995).

Bach, J.R. et al, "Virage image search engine: an open framework for image management", Storage and Retrieval for Image and Video Databases IV, Pro. SPIE 2670,(1996) pp. 76–87.

Bolle, R.M. et al, "Video query: research directions", IBM Journal of Research and Devlopment, 42(2),Mar. 1998, pp. 233–252.

Carson, C. et al., "Region–based image querying", Proc. IEEE Workshop on Content–Based Analysis of Images and Video Libraries, (1997) pp. 42–49.

Deerwester S. et al, "Indexing by latent semantic analysis", J. of the Am. Soc. For Information Science, (1990), vol. 41, pp. 391–407.

Lipson, P. et al., "Configuration based scene classification and image indexing", Proc. of CVPR, (1997), pp. 1007–1013.

(List continued on next page.)

Primary Examiner—Yon J. Couso
(74) Attorney, Agent, or Firm—Ladas & Parry

(57) ABSTRACT

A method, an apparatus and a computer program product for indexing and retrieving image data using visual keywords (108) is disclosed. Visual keywords (108) are prototypical, visual tokens (104) and are extracted from samples of visual documents (100) in a visual-content domain via supervised and/or unsupervised learning processes. An image or a video-shot key frame is described and indexed by a signature (112) that registers the spatial distribution of the visual keywords (108) present in its visual content. Visual documents (100) are retrieved for a sample query (120) by comparing the similarities between the signature (112) of the query (120) and those of visual documents (100) in the database. The signatures (112) of visual documents (100) are generated based on spatial distributions of the visual keywords (108). Singular-value decomposition (114) is applied to the signatures (112) to obtain a coded description (116).

78 Claims, 3 Drawing Sheets

OTHER PUBLICATIONS

Niblack, W. etal., "The QBIC project: querying images by . . . shapes". Storage and Retrieval for Image and Video Databases, Proc.SPIE 1908 (1993) pp. 173–181.

Papageorgiou P.C. et al. "A general framework for object detection". Proc. ICCV, Jan. 1998 pp. 555–562.

Pentland, A. etal, "Photobook: Content–based manipulation of Image Databases", Internation J. of Computer Vision 18(3), (1996) pp. 233–254.

Ratan, A.L. et al., "Training Templates for Scene Classification Using a few Examples", Proc IEEE Workshop on Content–Based Analysis of Images and Video Libraries, (1977), pp. 90–97.

Rowe, L., et al., "Indexes for User Access to Large Video Databases", Storage and Retrieval for Image and Video Databases II, Proc. SPIE 2185, (1994), pp. 150–161.

Smith, J.R., et al., "VisualSEEK: a fully automated content–based image guery system", Proc. ACM Multimedia 96, (Nov. 1996) pp. 87–98.

Sparck Jones, K. et al., *Reading in Information retrieval*. Morgan Kaufmann Publishers, Inc., (1997), pp. 273–280.

Sung, K. K., et al., "Example–based Learning for View–based Human Face Detection", A.I. Memo 1521, A.I. Lab, Mass. Institute of Technology, (Dec. 1994) pp. 3–9.

Kohonen, T., *Self–Organising Maps*, Spring–Verlog, $2^{nd}$ Exd., (1997) pp. 85–88.

Xie, X.L., et al., "A Validity Measure for Fuzzy Clastering", IEEE Trans. Of Pattern Analysis and Machine Intelligence, vol. 13, No. 8, (Aug. 1991) pp. 841–847.

Mitchell, T. M., *Machine Learning*, McGraw–Hill International, (1997), pp. 191–196.

\* cited by examiner

METHOD AND APPARATUS FOR INDEXING AND RETRIEVING IMAGES USING VISUAL KEYWORDS

FIELD OF THE INVENTION

The present invention relates to the field of computer-based image analysis, and more particularly to systems of classifying and searching image data dependent upon the content of the image data.

BACKGROUND

Text retrieval based on keywords has been the main stream in the field of information retrieval. A number of existing visual retrieval systems extract and annotate the visual content of data objects manually, often with some assistance by means of user interfaces. An example of such a system is given by Rowe, L. A., Borexzky, J. S., and Eads, C. A., "Indices for User Access to Large Video Databases," *Storage and Retrieval for Image and Video Databases II, Proc. SPIE* 2185, 1994, pp. 150–161. Once keywords are associated with the visual content, text retrieval techniques can be used easily. Although text descriptions may reflect the (largely conceptual) semantics of multimedia data, they may also result in a combinatorial explosion of keywords in the attempted annotation due to the ambiguous and variational nature of multimedia data. Also, there is a limit to how much semantic information textual attributes can provide, as described by Bolle, R. M., Yeo, B. L., and Yeung, M. M., "Video Query: Research Directions", *IBM Journal of Research and Development*, 42(2), March 1998, pp. 233–252.

On the other hand, visual content-based retrieval systems have mainly focused on using primitive features such as colour, texture, shape, etc., for describing and comparing visual contents. Examples of such systems include: Bach, J. R., et al., "Virage Image Search Engine: An Open Framework for Image Management," *Storage and Retrieval for Image and Video Databases IV, Proc. SPIE* 2670, 1996, pp. 76–87; Niblack, W., et al., "The QBIC Project: Querying Images By Content Using Colour, Textures and Shapes," *Storage and Retrieval for Image and Video Databases, Proc. SPIE* 1908, 1993. pp. 13–25; and Pentland, A., Picard, R. W., and Sclaroff, S., "Photobook: Content-Based Manipulation of Image Databases," *Intl. J of Computer Vision*, 18(3), 1996, pp. 233–254. When these feature-based techniques are applied to individual objects, an object is often the focus of retrieval. Not much consideration has been given to the interrelationship among the objects.

Region-based query methods rely on colour and texture segmentation to transform raw pixel data into a small set of localised, coherent regions in colour and texture space ("blobworld") and perform similarity-based retrieval using these regions. Such a system is described by Carson, C. et al., "Region-based image querying," *Proc. IEEE Workshop on Content-Based Analysis of Images and Video Libraries*, 1997, pp. 42–49. However, the regions are derived from each individual image without reference to any consistent attributes across images in a domain. Moreover, the segmentation of regions is in general not robust and may result in perceptually incoherent regions without meaningful semantics.

The VisualSEEK system has been described by Smith, J. R. and Chang, S.-F., "VisualSEEk: A Fully Automated, Content-Based Image Query System," *Proc. ACM Multimedia 96*, Boston, Mass., Nov. 20, 1996. This system and its descendants consider the spatial relationship among regions and combine it with primitive features of the regions for image retrieval. The matching algorithm merges lists of image candidates, resulting from region-based matching between a query and database images, with respect to some threshold and tends to be rather complex and ad hoc in realisation. The segmentation of regions is based on colour only, and no object or type information is extracted from the segmented regions.

In a different approach that advocates the use of global configuration, Ratan, A. L., and Grimson, W. E. L., "Training Templates for Scene Classification Using a Few Examples," *Proc. IEEE Workshop on Content-Based Analysis of Images and Video Libraries*, 1997, pp. 90–97, describe a method for extracting relational templates that capture the colour, luminance and spatial properties of classes of natural scene images from a small set of examples. The templates are then used for scene classification.

Although the method automates previous effort that hand-crafted the templates, such as Lipson, P., Grimson, E., and Sinha, P., "Configuration Based Scene Classification and Image Indexing," *Proc. of CVPR'97*, 1997, pp. 1007–1013, scene representation and similarity matching are computed through the relationships between adjacent small regular partitions, which are rather complex for comprehension.

In general, for text documents, the segmentation and extraction of keywords are relatively straight forward, since keywords are symbolic in nature. For visual data, which are perceptual and pattern-based, no equivalent visual keywords have been proposed.

U.S. Pat. No. 4,839,853 issued to Deerwester, et al. on Jun. 13, 1989 describes a methodology that exploits higher-order semantic structure implicit in the association of terms with text documents known as Latent Semantic Analysis (LSA). Using singular value decomposition (SVD) with truncation, LSA captures underlying structure in the association of terms and documents, while attempting to remove the noise or variability in word usage that plagues word-based retrieval methods. The derived coded description achieves a reduction in dimensionality while preserving structural similarity in term-document association for similarity matching. However, no similar method has been proposed for visual domains since there is no equivalent notion of visual keywords.

U.S. Pat. No. 4,944,023 issued to Imao, et al. on Jul. 24, 1990 describes a method for describing an image by recursively and equally dividing the image into $2^n$ regions until each region includes two or less kinds of regions, and each of the $2^n$ regions further into $2^n$ sub-regions of the same kind. Thus, an image is represented as a binary tree of local homogeneous regions. Though it cuts an image into types of regions and sub-regions, it does not further extract regularities of these regions across images nor uses the tree representation for comparing image similarities.

U.S. Pat. No. 5,710,877 issued to Marimount, et al. on Jan. 20, 1998 describes an image structure map (ISM) to represent the geometry, topology and signal properties of regions in an image and to allow spatial indexing of the image and those regions. Another objective of ISM is to support interactive examination and manipulation of an image by a user. No attempt is given to define object or type information across collection of images or to use ISM as a means for image retrieval. U.S. Pat. No. 5,751,852 issued to Marimount, et al. on May 12, 1998 elaborates on the ISM.

U.S. Pat. No. 5,751,286 issued to Barber, et al. on May 12, 1998 describes an image query system and method underlying the QBIC system. Queries are constructed in an image query construction area using visual characteristics such as colours, textures, shapes, and sizes. Retrieval of images is performed based on the values of representations of the visual characteristics and the locations of the representations of the query in the image query construction area. Aggregate measures of low-level features are often used for similarity matching. No object or type information is compiled from the images in the database for comparing similarity between two image contents.

U.S. Pat. No. 5,781,899 issued to Hirata on Jul. 14, 1998 describes a method and system to produce image index for image storage and management system. Images similarity matching is based on zones, which consist of at least one pixel in the original images, divided from the images using hue, brightness, and grid information. The size of the zone-divided image is adjusted according to the similarity for integrating the zones against some threshold to determine the total number of zones for use as an index. The zones are specific to an image. No prototypical zones are compiled in advance for describing image contents.

U.S. Pat. No. 5,802,361 issued to Wang, et al. on Sep. 1, 1998 describes a method and system for querying images and videos based on a variety of attributes of images such as motion, colour, textures, segments etc and also complex Boolean expression based on these attributes. Its unique user interface allows a user to graphically construct a query with icons representing different kinds of image attributes by selecting the icons into a user playground area. Besides low-level features, it also supports matching of arbitrarily shaped regions representing meaningful objects such as human faces, which are templates predetermined by the system or supplied by the user.

However, there is no systematic and automatic process to extract object or type information over collection of images and to compute its spatial distribution in a visual content.

U.S. Pat. No. 5,819,288 issued to De Bonet on Oct. 6, 1998 discloses a method for generating a semantically based, linguistically searchable, numeric descriptor of a predefined group of input images. A signature is computed for each image in a set using multi-level iterative convolution filtering with predefined Gaussian kernels for each predefined visual characteristic. Each element of the signature is taken as the averaged pixel value produced by the last convolution filter for the corresponding visual characteristic. An average and a variance are derived for each element of the signature across all the signatures of the predefined group of images. A database manager associates predefined linguistic terms with these simple statistical measures. Images are retrieved, in response to a linguistic term chosen by a user, by comparing the signatures of the images with the associated statistical measure of an image set. Though statistical information is extracted over a set of images, only global means and variances after iterative convolution are retained for signature similarity matching. Spatial distribution information is not utilised.

Thus, a need clearly exists for an improved system of classifying and searching image data dependent upon the content of the image data.

SUMMARY

In accordance with a first aspect of the invention, there is disclosed a method of indexing and retrieving a visual document using visual keywords. The method includes the steps of: providing a plurality of visual keywords derived using a learning technique from a plurality of visual tokens extracted across a predetermined number of visual documents; comparing a plurality of visual tokens of another visual document with the visual keywords, a comparison result being represented by a three-dimensional map of detected locations of the visual keywords; and determining a spatial distribution of visual keywords dependent upon the comparison result to provide a visual-content signature for the visual document.

Preferably, the method includes the step of comparing two visual documents by matching the visual-content signatures of the visual documents. More preferably, the comparing step involves use of one or more predetermined similarity measures.

Preferably, the visual-content signature is a spatial aggregation map.

The method can also include the step of coding the visual-content signature to reduce the dimensionality of the visual-content signature to provide a coded description of the visual document. It may further include the step of comparing two visual documents by matching the coded descriptions.

Preferably, the method further includes the step of extracting a plurality of visual tokens from the content of one or more visual documents, each visual token being represented by one or more predefined visual characteristics. The extracting step can be dependent upon predefined receptive fields and displacements. The predefined receptive fields may have a predetermined size. The displacements may have predetermined sizes. Alternatively, two or more of the predefined receptive fields may have different sizes. Displacements may have different sizes too.

The method may include the step of generating the visual keywords using the learning technique from the visual tokens extracted across the predetermined number of the visual documents. Preferably, the learning technique is a supervised and/or unsupervised learning technique. Also, the method may include the step of representing the outcome of the visual-token comparing step by a vector of real values, each corresponding to a visual keyword, to provide the three-dimensional map of the detected locations of the visual keywords. The three-dimensional map is a type evaluation map.

Preferably, the extracting step utilises a plurality of predefined receptive fields and displacements in horizontal and vertical directions to tessellate the two-dimensional visual content of the visual documents. The extracting step may also include the step of transforming a visual token, being the part of the visual content covered by a receptive field, into a vector of real values representing one or more visual characteristics of the visual token.

Optionally, the generating step utilises a plurality of view-based recognisers and a supervised learning technique to train the view-based recognisers from positive and negative visual tokens of a view of an object, the trained view-based recognisers being the visual keywords. Alternatively, the generating step may utilise a plurality of cluster-based parameters and an unsupervised learning technique to modify the cluster-based parameters using a collection of the visual tokens, the trained cluster-based parameters being the visual keywords.

The comparing step may further include the step of estimating a confidence factor or set membership of the visual token to each of the visual keywords. It may also include the step of iteratively computing the confidence factor or set membership for each of the visual tokens in a given visual content, resulting in the three-dimensional map of detected locations of the visual keywords. The determining step may include the step of summarising the confidence factors or set memberships of the three-dimensional map of detected locations to provide a three-dimensional map regarding occurrences of the visual keywords.

More preferably, the coding step utilises a singular-value decomposition transform to represent a matrix X formed by concatenating linearised visual content signatures of visual documents as column vectors such that $X=USV^T$ of rank r and obtains an approximate representation $X_k=U_k S_k V_k^T$ of rank k, where $k \leq r$. It may further include the step of transforming a visual content signature of a visual document D to generate a coded description D' as $D'=D^T U_k S_k^{-1}$.

Optionally, a plurality of similarity matching functions are used, each for comparing the similarity between the visual-content signatures of two visual documents. The method may also include the step of determining which similarity measure, among those produced by the plurality of similarity matching functions on pairs of the visual content signatures of the two visual documents, to use as a final similarity measure between the two visual documents.

In accordance with a second aspect of the invention, there is disclosed an apparatus for indexing and retrieving a visual document using visual keywords. The apparatus including: a device for providing a plurality of visual keywords derived using a learning technique from a plurality of visual tokens extracted across a predetermined number of visual documents; a device for comparing a plurality of visual tokens of another visual document with the visual keywords, a comparison result being represented by a three-dimensional map of detected locations of the visual keywords; and a device for determining a spatial distribution of visual keywords dependent upon the comparison result to provide a visual-content signature for the visual document.

In accordance with a third aspect of the invention, there is disclosed a computer program product having a computer readable medium having a computer program recorded thereon for indexing and retrieving a visual document using visual keywords. The computer program product includes: a module for providing a plurality of visual keywords derived using a learning technique from a plurality of visual tokens extracted across a predetermined number of visual documents; a module for comparing a plurality of visual tokens of another visual document with the visual keywords, a comparison result being represented by a three-dimensional map of detected locations of the visual keywords; and a module for determining a spatial distribution of visual keywords dependent upon the comparison result to provide a visual-content signature for the visual document.

BRIEF DESCRIPTION OF THE DRAWINGS

In the following description, several embodiments of the invention are described with reference to the drawings, in which.

DETAILED DESCRIPTIONS

Figure 1:
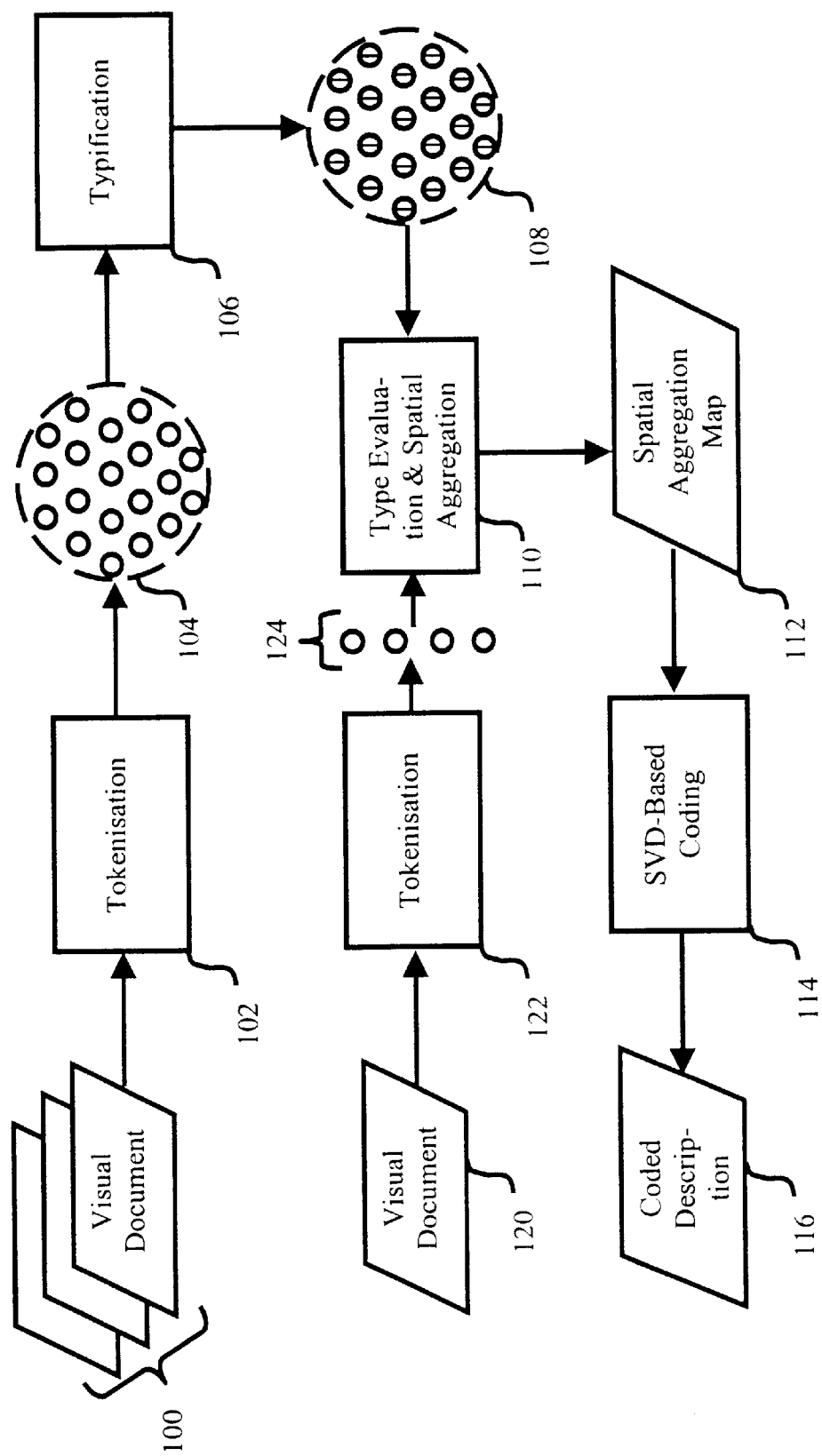
FIG. 1 is a block diagram illustrating a system for generating visual keywords and a visual content signature based on the visual keywords in accordance with a first embodiment of the invention.

A method, an apparatus, and a computer program product for indexing image data in a database using visual keywords are described hereinafter. Correspondingly, a method, an apparatus, and a computer program product for retrieving image data from a database using visual keywords are also described. In the description of the embodiments of the invention, numerous specific features including colour spaces, primitive features, image sizes, etc, are set forth in detail. However, those skilled in the art will readily appreciate in view of this disclosure that the invention may be practised with variations. Other well known features have not been set forth in detail, so as not to unnecessarily obscure the invention. Before describing specific embodiments of the invention, an overview of the image-indexing and image-retrieval systems using visual keywords is provided.

Overview of Image Indexing and Image Retrieval Systems

Embodiments of the invention provide a system for creating visual "keywords" from visual documents. The visual keywords are prototypical, visual entities present in the content of a given distribution of visual documents, which can include digital images and video-shot keyframes. A keyframe is a predetermined or periodic video frame in a sequence of video frames that can be selected as representative of the portion of video. Keyframes can also be the start and stop frames of a portion of the video stream. The visual keywords are used to index visual documents using visual-content signatures based on spatial distributions of the visual keywords. Similarly, the visual keywords can be used to retrieve visual documents.

Using statistical learning techniques, the visual keywords can be derived from a sufficiently large sample of visual tokens derived from a visual-content domain. A visual token is a coherent unit (e.g., region of pixels) of a visual document. For supervised learning, detectors of salient objects can be induced from a training set of positive and negative examples of visual tokens collected from visual documents of a given visual-content domain. Such salient features include human faces, pedestrians, foliage, and clouds, for example. For a typical illustration on this point, reference is made to Sung, K. K., and Poggio, T., "Example-based Learning for View-based Human Face Detection", *A. I. Memo* 1521, A. I. Lab., Massachusetts Institute of Technology, December 1994. This reference, which is incorporated herein by cross-reference, presents an example-based learning approach for locating vertical frontal views of human faces in complex scenes. The technique models the distribution of human face patterns by means of a few view-based "face" and "non-face" prototype clusters. A neural network classifier trains on a sequence of "face" (positive) and "non-face" (negative) examples to empirically discover a set of operating parameters and thresholds that separate "face" patterns and "non-face" patterns.

During operation, the trained neural classifier detects faces by exhaustively scanning an image for these face-like window patterns at all possible scales. At each image location, a difference-feature vector is computed between the local image window pattern and the learned distribution-based model. Based on the difference feature vector, the trained classifier determines whether or not a human face exists at the current image location. On a database of high quality facial images, detection accuracy is 96.3%. The approach can be generalized and applied to other domains, as shown by Papageorgiou, P. C., Oren, M., and Poggio, T., "A General Framework for Object Detection," *Proc. ICCV,* Bombay, India, January 1998, pp. 555–562. Further, detectors may be further specialised for different views (e.g., frontal and side views of human faces, skies of cloudy and clear days, etc) to improve their detection accuracy.

Alternatively, unsupervised methods including self-organising maps (SOM), fuzzy c-means (FCM) clustering algorithm, and the expectation-maximisation (EM) algorithm can be used to determine regularities in the visual tokens contained in the visual documents. These methods give a spectrum of popular and effective clustering methods. In view of the disclosure herein, those skilled in the art will readily appreciate that the use of other algorithms to extract visual keywords would not depart from the scope and spirit of the invention. In this connection, reference is made to:

(1) Kohonen, T., *Self-Organising Maps.* Springer-Verlag, $2^{nd}$ Ed., 1997;
(2) Xie, X. L. & Beni, G., "A Validity Measure for Fuzzy Clustering," *IEEE Trans. on Pattern Analysis and Machine Intelligence*, 13(8), pp. 841–847; and
(3) Mitchell, T. M. (1997), *Machine Learning*, McGraw-Hill International, 1997.

A SOM is an unsupervised neural network model that defines a mapping from the input data space $R^n$ onto a (typically) 2-dimensional array of neurons or nodes. With every node, a parametric reference vector in $R^n$ is associated, and a neighbourhood of topographically close nodes, up to a certain geometric distance, is defined. During learning, an input vector is compared with all the reference vectors in some distance metric (e.g., Euclidean distance) and the best-matching node (i.e., winner) is selected to update its reference vector. Geometrically, this is equivalent to moving the winner towards the input vector. The nodes within the neighbourhood of the winner are also updated in a similar fashion, though to a lesser extent. After exposure to sufficiently large number of input vectors, the nodes of SOM form a "nonlinear projection" of the probability density function of the high-dimension input data vector onto the 2-dimensional display.

The FCM clustering algorithm is the fuzzy equivalent of the classical k-means "hard" clustering algorithm, which minimises the following objective function with respect to fuzzy memberships $\mu_{ij}$ and cluster centroids $V_i$, $J_m = \Sigma_{i=1} \Sigma_{j=1} (\mu_{ij})^m d^2(X_j, V_i)$, where i sums over the number of clusters, j sums over the number of data points or vectors $X_j$, and m>1 is the fuzziness index. The distance metric is defined as $d^2(X_j, V_i) = (X_j - V_i)^T A(X_j - V_i)$, where A is a p×p positive definite matrix, and p is the dimension of the vectors $X_j$. Starting from an initial guess of fuzzy memberships $\mu_{ij}$, the execution of FCM alternates between the update of cluster centroids $V_i$ and fuzzy memberships $\mu_{ij}$. The cluster centroids $V_i$ are updated as the averages of the data points, weighted by the current fuzzy memberships and the fuzzy memberships $\mu_{ij}$ are modified as inversely proportional to the distance between $X_j$ and current values of $V_i$. The FCM algorithm always converges to strict local minima of $J_m$, though different choices of initial $\mu_{ij}$ might lead to different local minima.

The EM algorithm is a widely used approach to learning in the presence of unobserved variables. It can be used even for variables having values that are never directly observed, provided the general form of the probability distribution governing these variables is known. It is also the basis for many unsupervised clustering algorithms. For example, an algorithm can be designed to estimate the means of a mixture of k Normal distributions. The essence of the EM approach is that the current hypothesis is used to estimate the unobserved variables and their expected values are calculated (the E step). A new maximum likelihood hypothesis is computed, assuming the values of the hidden-variables are those expected values obtained previously (the M step). It can be established that on each iteration through these E and M steps, the EM algorithm increases the likelihood unless it is at a local maximum. Thus, the EM algorithm converges to a local maximum.

Using unsupervised learning methods, cluster centers (fuzzy or probabilistic) representing prototypical visual entities are formed from a training set of visual tokens sampled from the visual documents of a given visual-content domain.

At a higher level, interrelationships amongst objects, including spatial, temporal, and logical ones, provide a coherent global interpretation of a given visual content in terms of its components. For example, a coastline, natural-scene image is often composed of "sky", "sea", "foliage"/ "mountain" and the like in a certain layout fashion. A relatively consistent, schematic configuration can be derived statistically from the visual data. For more information, reference is made to Lipson, P., Grimson, E., and Sinha, P., "Configuration Based Scene Classification and Image Indexing", *Proc of CVPR'97*, 1997, pp. 1007–1013, and to Ratan, R. L., and Grimson, W. E. L., "Training Templates for Scene Classification Using a Few Examples", *Proc. IEEE Workshop on Content-Based Analysis of Images and Video Libraries*, 1997, pp. 90–97.

For a visual document to be stored in the database or an image-query sample, location-specific visual tokens are extracted and compared against a set of visual keywords learned a priori. A spatial distribution of fuzzy (or probabilistic) occurrences of visual keywords is computed as a signature for the image. Thus, a similarity comparison between two images for image retrieval or categorisation can be reduced to similarity matching between the signatures of the two images.

To reduce the dimensionality of, and possibly also any noise in, the visual-content signatures, a statistically-based coding method is used to transform the signatures into real-valued vectors of lower dimensions. The resulting coded descriptions are practical alternatives for efficiently matching the similarity of two images for image retrieval or categorisation applications.

The embodiments of the invention seek to provide an improved system for content-based indexing and retrieval of visual documents by integrating both local (i.e., object) type information and global (i.e., spatial) configuration information present in the visual content of the documents. Preferably, the system is practised using MPEG-7.

First Embodiment

FIG. 1 is a block diagram illustrating the process of extracting visual keywords from a visual document and producing visual-content signatures. Visual documents 100 and 120 are complete units of visual or image data. Examples of visual documents 100 and 120 include digital images, video shots represented by their keyframes, and the like. The visual documents 100 are provided as input to the tokenisation module 102. In the following description, components of the system are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

The tokenisation module 102 systematically and automatically extracts visual tokens 104 (represented by small circles within a larger, dashed-line circle in FIG. 1). Again, the visual tokens 104 are coherent units (e.g., regions of pixels) of a visual document derived from several visual documents 100.

The visual tokens 104 are provided as input to a typification module 106, which creates visual keywords 108 from the set of visual tokens 104. The visual keywords 108 are also depicted as small circles within a larger, dashed-line circle. The visual keywords 108 are knowledge representations derived from supervised or/and unsupervised learning processes embodied in the typification module 106.

During indexing (or retrieval) of a visual document, a visual document (or a query sample) 120 is input to a tokenisation module 122 having similar functionality to that of the module 102 to produce corresponding visual tokens 124. The visual tokens 124 of the visual document and the visual keywords 108 are input to a type-evaluation and spatial-aggregation module 110. In this module 110, the location-specific visual tokens 124 are evaluated against the created visual keywords 108. The occurrences of the visual tokens 124 are aggregated spatially by the module 110 to form a spatial aggregation map (SAM) 112 as a visual-content signature for the visual document 120. Using a predetermined similarity measure, the SAMs 112 of visual documents can be used in similarity matching for image retrieval or image categorization applications.

The SAM 112 is provided as input to a singular-value-decomposition (SVD) based coding module 114, which reduces the dimensionality of, and possibly the noise in, the SAM 112 to produce a coded description 116 of a visual document 120. The SVD-based coding module 114 forms a frequency matrix X (not shown). The frequency matrix X associates visual keywords 108 and visual documents 100 by concatenating linearised SAM vectors of visual documents as column vectors of the matrix X. The module 114 applies singular-value decomposition to the frequency matrix X such that:

$$X = USV^T, \quad (1)$$

of rank r, where U and V matrices of left and right singular vectors, respectively, and S is a diagonal matrix containing the singular values of X along its diagonal. The module 114 obtains an approximate representation:

$$X_k = U_k U_k V_k^T, \quad (2)$$

of rank k, where $k \leq r$. A coded description 116 (D') can be computed for the visual document 120 (D), in the form of SAM 112, as follows:

$$D' = D^T U_k S_k^{-1}. \quad (3)$$

Similarity matching between two visual documents can be carried out using a predetermined similarity measure for their respective coded descriptions 116. The similarity measures that can be used, as described hereinafter, include cosine (i.e. normalised dot product), and $1-d(x, y)/d^{max}$, $e^{-d(x,y)/2}$, where $d(x, y)$ is the distance between x and y and $d_{max}$ is a maximum distance for normalisation purposes.

Figure 2:
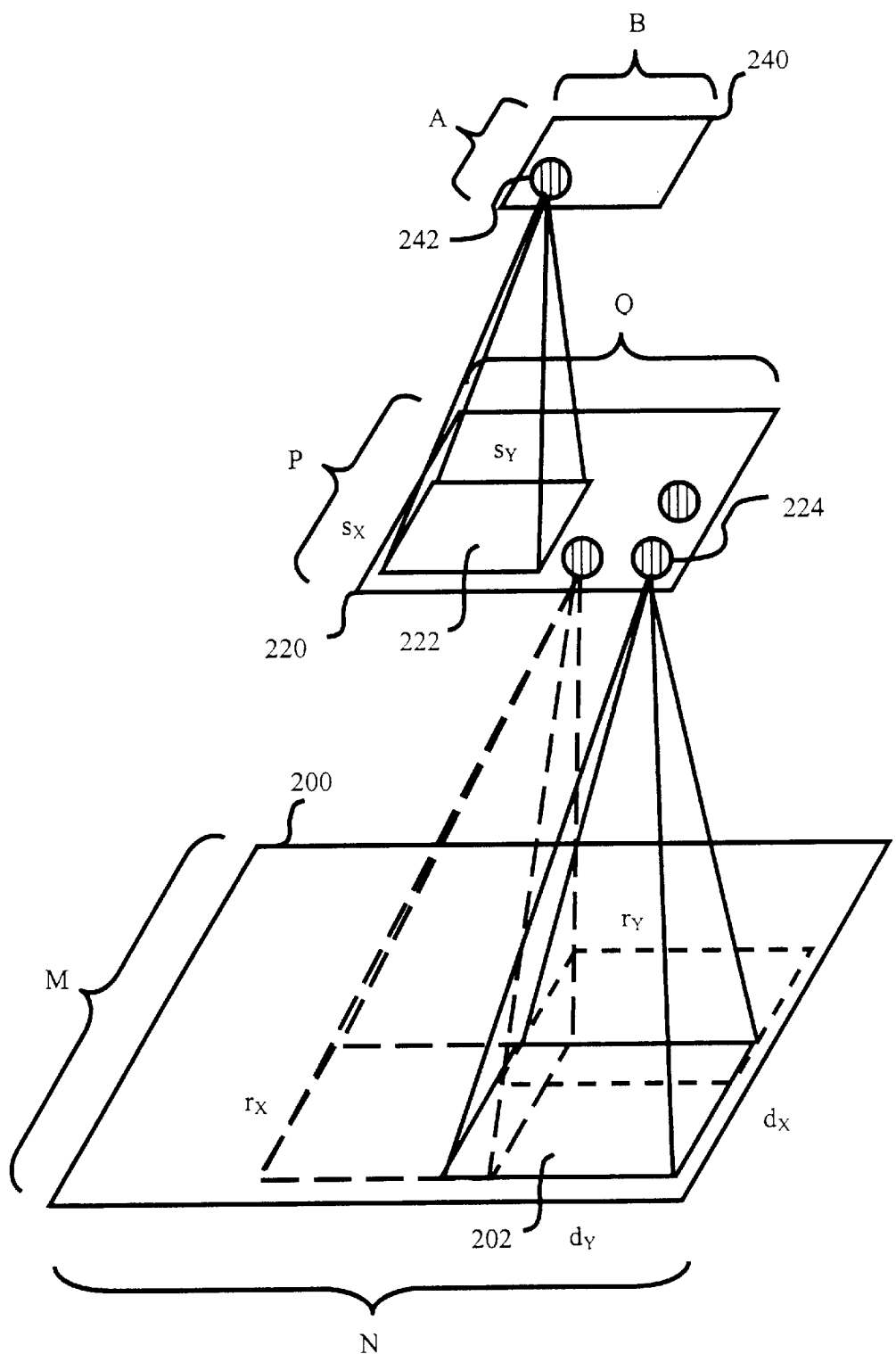
FIG. 2 is block diagram illustrating a three-layer visual information processing architecture for producing a visual content signature in accordance with the system of FIG. 1.

The processing and functionality of the modules shown in FIG. 1 are described in further detail with reference to FIG. 2. The derivation of a visual-content signature 112 using a three-layer visual information processing architecture is depicted in FIG. 2. The three layers are a pixel-feature layer 200, a type-evaluation layer 220, and a spatial-aggregation layer 240.

The pixel-feature layer 200 is the lowest layer. It is a collection of low-level feature planes at pixel level. For example, the colour feature of an image (I) or visual document 120 can have three red, green, and blue (R,G,B) planes of the same resolution. The image (I) has a resolution of M×N pixels in this layer, where M and N are both integers and (x, y) denotes a particular pixel.

The type evaluation layer, or type evaluation map (TEM), 220 is the middle layer. It is an abstraction of the lowest layer 200. The TEM 220 may have a lower resolution of P×Q pixels than the pixel-feature level 200, where $P \leq M$ and $Q \leq N$. Each pixel or node (p, q) 224 of the TEM 220 has a receptive field (R) 202. A receptive field specifies a two-dimensional region of size $r_X \times r_Y$ pixels in the image (I) 200 that influences the value of the node 224:

$$R = \{(x, y) \in I | x_p \leq x \leq x_{p'}, y_q \leq y \leq y_{q'}\}, \quad (4)$$

where $$r_X = x_{p'} - x_p + 1,$$

$$r_y = y_{q'} - y_q + 1,$$

and $(x_p, y_q)$ and $(x_{p'}, y_{q'})$ are the starting and ending pixels of the receptive field in the image I, respectively. The receptive field 202 is depicted with solid lines, while other receptive fields without reference numerals are depicted with dashed lines for illustrative purposes only. Solid lines extending from the node 224 indicate the size relationship between the node 224 and the corresponding receptive field 202.

Tesselation (a tiling pattern) displacements $d_X$ and $d_Y > 0$ are permitted in the X and Y directions, respectively. Adjacent nodes or pixels 224 in the TEM 220 along the X direction have receptive fields in the image (I) 200 that are displaced by $d_X$ pixels along the X direction. Likewise, adjacent nodes or pixels 224 along the Y direction have receptive fields displaced by $d_Y$ pixels along the Y direction. That is, two adjacent nodes or pixels 224 in layer 220 share pixels in their receptive fields 202 unless $d_X \geq r_X$, or similarly $d_Y \geq r_Y$.

Preferably, the size of a receptive field $(r_X, r_Y)$ 202 and the displacements $(d_X, d_Y)$ for all pixels 224 in the TEM 220 are fixed, and $(M - r_X)$ is divisible by $d_X$ and $(N - r_Y)$ is divisible by $d_Y$. That is, the spatial dimensions of TEM 220 are determined by $(r_X, r_Y)$ and $(d_X, d_Y)$:

$$P = (M - r_X)/d_X + 1,$$

and $$Q = (N - r_Y)/d_Y + 1. \quad (5)$$

If this is not the case (i.e. indivisible), the collective receptive fields can be centred at the centre of the image (I) 200 and the residues at the boundaries can be ignored.

A visual token $t_j$ 104, 124 is a receptive field in image (I) 200. Different perceptual features such as colour, texture, shape, motion, etc., can characterise a visual token 104, 124. The spatial dimensions of the TEM 220 of a visual document (D) 100, 120 can quantify the number of the visual tokens 104, 124 in the visual document (D) 100, 120. Every pixel or node (p, q) in the TEM 220 registers the set/class membership of a visual token 104, 124 governed by its receptive field 202 against T visual keywords that have been extracted a priori. Thus, a TEM 220 is a three-dimensional map, $G = P \times Q \times T$, that registers local type information. More than one TEM is allowed to tessellate image (I) with different configurations of receptive fields and displacements.

The spatial aggregation layer, or spatial aggregation map (SAM), 240 is the highest layer and is a summary of the TEM 220. A receptive field (S) 222 of size $s_X$, $s_Y$ and a displacement size $c_X$, $c_Y$ (not shown in FIG. 2, but analogous to $d_X$, $d_Y$ shown in the lower layer 200) are used to tessellate the spatial extent (P, Q) of the TEM 220. The SAM 240 has dimensions of A×B, with A≦P and B≦Q receptive fields. The memberships G(p, q, t) (∈[0,1]) of visual keywords t at the pixel (p, q) of the TEM 220 that falls within the receptive field 222 of the pixel (a, b) 242 of the SAM 240 are aggregated:

$$H(a, b, t) = \Omega_{(p, q) \in S(a, b)} G(p, q, t), \quad (6)$$

where S(a, b) denotes the receptive field 222 of the pixel (a, b) 242 in the SAM 240. The aggregation function Ω can include one of the following:

$$H(a, b, t) = \Sigma_{(p, q) \in S(a, b)} G(p, q, t), \quad (7)$$

where the occurrences of each visual keyword t in a spatial extent (p, q)∈S(a, b), specified by the receptive field 222 of the pixel (a, b) 242, are summed; or The matrix C is a co-occurrence matrix (similar to the gray-level co-occurrence matrix in statistical texture analysis) on visual keywords for a given position operator ρ, which can be specified by a displacement vector or by an angle and a distance. C is a T×T matrix whose element c(t, u) is an estimate of joint conditional probability that visual keywords t and u satisfy ρ within a spatial extent (p, q)∈S(a, b). If only co-occurrences of the same visual keywords are used, H(a, b, t)=C(t, t), i.e., the diagonal entries of C.

Thus, the SAM 240 is a three-dimensional map, H=A×B×T, where T is the number of visual keywords. More than one SAM is allowed to tessellate the TEM 220 with different configurations of receptive fields and displacements.

Further Embodiments

In a second embodiment of the invention, a visual document database 100 can have 500 natural scene images, for example, stored in some common image file formats including TIFF, JPEG, GIF, and the like. Other numbers of visual documents may be contained in the database 100. To simplify signature production, the images 100 are normalised to a common resolution (e.g., 256×256 pixels) using conventional image processing techniques. Colour and texture descriptors are used to characterise the natural scenes contained in the visual document database 100. The pixel-feature layer 200 uses, for example, the YIQ colour model (used in commercial colour TV broadcasting) and texture features based on wavelet decomposition. More specifically, an image of 256×256 pixels (i.e., M=256 and N=256) can be pre-processed into a number of planes. This can include three planes of Y, I, Q values (transformed from RGB values) and six planes of horizontal-, vertical-, and diagonal-orientation texture values based on two levels of wavelet decomposition. All of the planes can have the same resolution.

The receptive field ($r_X$, $r_Y$) 202 of a pixel (p, q) 224 of the TEM (G) 220 can be defined as 32×32 pixels with displacements $d_X$=16 and $d_Y$=16. This results in a TEM 220 with dimensions P=15 pixels and Q=15 pixels. A visual token 104, 124 is represented as a feature vector extracted from the corresponding regions of size 32×32 in the nine pixel-feature planes (i.e., three colour and six texture planes).

For each 32×32 region of pixel-feature values, the mean values are computed as a feature. This results in a 9-dimension feature vector for a visual token. Tokenisation modules 102, 122 therefore implement systematic and automatic processing that converts all valid regions covered by the 15×15 pixel receptive fields of the TEM 220 into visual tokens 104, 108, represented as 9-dimension feature vectors. Alternatively, smaller receptive fields of $r_X$=24, $r_Y$=24, $d_X$=12, and $d_Y$=12 can be practised and the TEM 220 has 20×20 pixels. Multiple TEMs 220 can be used with different receptive field sizes to cater for visual objects at multiple resolutions. Similarly, a TEM 220 can also have heterogeneously sized receptive fields.

Preferably, unsupervised learning is implemented in the typification module 106. In particular, a fuzzy c-means clustering (FCM) technique may be used. Other unsupervised learning techniques known to those skilled in the art may be used instead. The visual tokens 104, represented as 9-dimension feature vectors, are treated as data points in the 9-dimension feature space for FCM. Preferably, one thousand visual keywords 108 are used. The outcome of FCM processing by the typification module 106, upon convergence or termination, is one thousand fuzzy centroids, each represented as a 9-dimension vector. Since 15×15 visual tokens 104 can be extracted from a visual document 100, tokenisation 102 on five hundred visual documents 100 results in 112,500 data points available for FCM. Each fuzzy centroid typifies a group of similar visual tokens 104.

Alternatively, supervised learning can be employed in the typification module 106. Object detectors are designed in the module 106 for the types of objects in the visual content domain. For the case of natural scene images, object detectors are used for sky, waves, foliage, snowy mountains, and the like. Typically, view-based recognisers are trained from positive and negative examples of visual tokens 104 for different types of objects. Each object type can be further subdivided into different views to improve the performance of the detectors (i.e., object-view detectors). Exemplary example-based, object-view recognisers are neural networks. Labelled visual tokens available are used as a training set for the neural network. Each visual keyword 108 is a trained neural network capable of detecting visual tokens 104 that correspond to the object-view it was trained for.

When visual keywords are derived from unsupervised learning (e.g., FCM), the type evaluation and spatial aggregation module 110 compares a visual token 124, represented as a 9-dimension feature vector, against the fuzzy centroids 108. Both the visual token 124 and the fuzzy centroids 108 are 9-dimension vectors. This is done to compute the fuzzy membership of the visual token 124 with respect to the fuzzy clusters, denoted by the fuzzy centroids 108. Thus, each pixel (p, q) 224 of the TEM (G) 220 carries an array of fuzzy membership values, each representing the typicality of the visual token, in the receptive field 202 of (p, q) 224, to a visual keyword 108.

Alternatively, if the visual keywords 108 are trained neural object-view detectors, type evaluation and spatial aggregation module 110 feeds a visual token 124, represented as a 9-dimension feature vector, to the neural networks 108 as unknown input. Again each pixel (p, q) 224 of the TEM (G) 220 carries an array of output node values of the neural networks, signifying how typical the visual token 124 is to the object-view classes learned by the neural networks 108. Each pixel (p, q) 224 of the TEM 220 registers the type information of a visual token 124 with respect to the visual keywords 108.

After type evaluation processing 110 at the TEM 220, spatial aggregation processing 110 further summarises the type information in the TEM 220. Likewise, receptive fields ($s_X$, $s_Y$) 222 and displacements ($c_X$, $c_Y$) of the pixels (a, b) 242 of the SAM (H) 240 are used to divide the TEM 220 into possibly overlapping spatial regions, and the occurrences of visual keywords are aggregated. In an extreme case, the SAM 240 may include only one pixel having a receptive field 222 that covers the entire TEM 220 (i.e., the receptive field $(s_X, s_Y)=15\times15$ pixels and the displacements $(c_X, c_Y)=(0, 0)$). In another extreme case, the SAM 240 may degenerate to the TEM 220, where the receptive field $(s_X, s_Y)=1\times1$ and the displacements $(c_X, c_Y)=(1, 1)$. Other than the foregoing extreme cases, an example of the regular tessellation of the TEM 220 is that the receptive fields $(s_X, s_Y)=3\times3$ and the displacements $(c_X, c_Y)=(3, 3)$, resulting in $5\times5$ disjoint blocks across the TEM 220. Alternatively, another regular tessellation of the TEM 220 can be that the receptive fields $(s_X, s_Y)=6\times6$ and the displacements $(c_X, c_Y)=(3, 3)$, resulting in $4\times4$ receptive fields 222 for the SAM 240. Taking horizontal and/or vertical strips across the TEM 220 can also provide regular tessellation. This is similar to horizontal and vertical projections in image processing. Also, irregular tessellation of the TEM 220 with varying sizes and displacements of the receptive fields 222 can be practised.

Each pixel (a, b) 242 of the SAM 240 aggregates the occurrences of the type information (i.e., visual keywords) present in the TEM 220 with respect to the spatial coverage of the pixel 242 as specified by its receptive field 222. Two exemplary aggregation methods are disclosed, although others may be practised without departing from the scope and spirit of the invention.

Firstly, the aggregation method $H(a, b, t) = \Sigma_{(p, q) \in S(a, b)} G(p, q, t)$. The occurrences of each visual keyword t in a spatial extent $(p, q) \in S(a, b)$, specified by the receptive field 222 of the pixel (a, b) 242, are summed.

Secondly, another aggregation method is to use only co-occurrences of the same visual keywords, $H(a, b, t)=C(t, t)$ (i.e., the diagonal entries of C). Generally, a co-occurrence matrix C (similar to a grey-level, co-occurrence matrix in statistical texture analysis) can be defined using visual keywords for a given position operator ρ. The position operator can be specified by a displacement vector, or by an angle and a distance. An example of a position operator for a given pixel (p, q) is the pixel to the right of the pixel (p, q). The co-occurrence matrix C is a T×T matrix having an element c(t, u), which is an estimate of the joint conditional probability that visual keywords t and u satisfy ρ within a spatial extent $(p, q) \in S(a, b)$.

After processing by the type evaluation and spatial aggregation module 110, the SAM (H) 112 contains spatial distribution information about the visual keywords in a visual document 120. The SVD-based coding module 114 reduces the dimensionality of, and possibly the noise in, the SAM 112, 240. For the case where one thousand visual keywords 108 are extracted from five hundred visual documents 100 and a 5×5 SAM 112, 240 is used based on the regular tessellation of the TEM 220, a frequency matrix X has 1000×25=25,000 rows versus 500 columns. That is, each row contains the occurrences of a specific visual keyword within a spatial region, and each column is a SAM signature of a visual document 120. The dimensions of U, S, and $V^T$ are 25,000×r, r×r, and r×500, respectively, where r is the rank of the frequency matrix X. To obtain an approximate version of X using Equation (2), the first 180 factors (i.e., k=180) may be retained. Consequently, $U_k S_k$ and $V_k^T$ have dimensions of 25,000×180, 180×180, and 180×500, respectively. A coded description (D') 116 for a visual document (D) 120 can be computed as $D'=D^T U_k S_k^{-1}$, where $D_T$ is a 1×25,000 row vector (i.e., SAM (H)), and D' is a 180-dimension row vector.

Similarity matching between two visual documents 120 can be carried out using appropriate similarity measure for their respective coded descriptions 116. The similarity measure between two vectors of coded descriptions x and y include cosine (i.e. normalized dot product), and $1-d(x, y)/d_{max}$, $e^{-d(x, y)/2}$, where $d(x, y)$ is the distance between x and y and $d_{max}$ is a maximum distance for normalization purposes.

Computer Implementation of Embodiments

Figure 3:
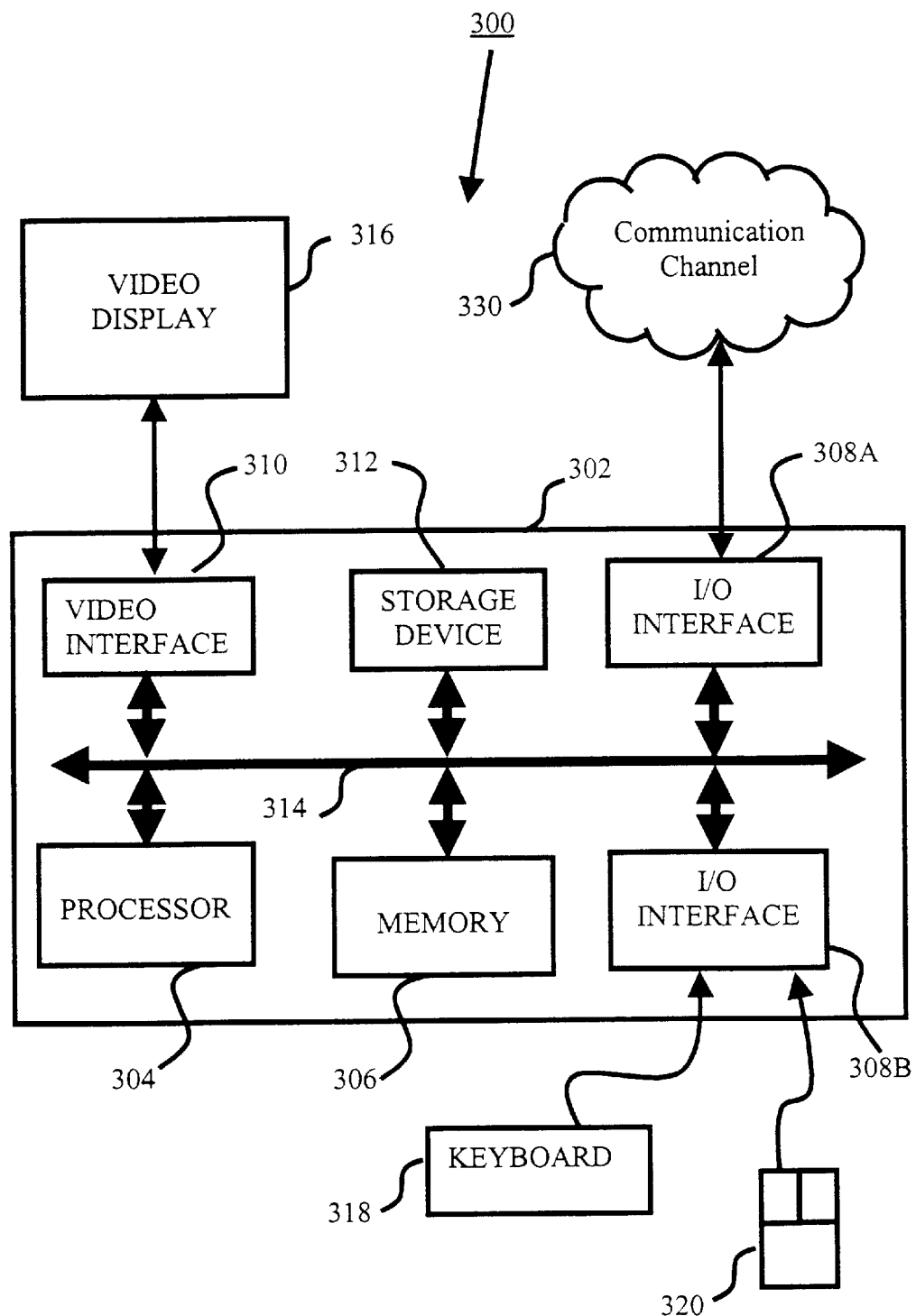
FIG. 3 is a block diagram of a general-purpose computer with which the first embodiment of the invention depicted in FIGS. 1 and 2 and other embodiments of the invention can be practised.

As described hereinbefore, the embodiments of the invention can be implemented using a computer system, such as the general-purpose computer shown in FIG. 3. In particular, the processes of FIG. 1 can be implemented as software, or a computer program, executing on the computer. The method or process steps for indexing image data in a database using visual keywords are effected by instructions in the software that are carried out by the computer. Likewise, the method or process steps for retrieving image data from a database using visual keywords can be effected in this manner. Again, the software may be implemented as one or more modules for implementing the process steps. That is, a module is a part of a computer program that usually performs a particular function or related functions.

In particular, the software may be stored in a computer readable medium, including the storage devices described below. The software is loaded into the computer from the computer readable medium and then the computer carries out its operations. A computer program product includes a computer readable medium having such software or a computer program recorded on it that can be carried out by a computer. The use of the computer program product in the computer preferably effects advantageous apparatuses for indexing image data in a database using visual keywords and for retrieving image data from a database using visual keywords in accordance with the embodiments of the invention.

The computer system 300 includes the computer 302, a video display 316, and input devices 318, 320. In addition, the computer system 300 can have any of a number of other output devices including line printers, laser printers, plotters, and other reproduction devices connected to the computer 302. The computer system 300 can be connected to one or more other computers via a communication interface 308A using an appropriate communication channel 330 such as a modem communications path, an electronic network, or the like. The network may include a local area network (LAN), a wide area network (WAN), an Intranet, and/or the Internet.

The computer 302 includes: a central processing unit(s) (simply referred to as a processor hereinafter) 304, a memory 306 that may include random access memory (RAM) and read-only memory (ROM), input/output (IO) interfaces 308A and 308B, a video interface 310, and one or more storage devices generally represented by a block 312 in FIG. 3. The storage device(s) 312 can consist of one or more of the following: a floppy disc, a hard disc drive, a magneto-optical disc drive, CD-ROM, magnetic tape or any other of a number of non-volatile storage devices well known to those skilled in the art. Each of the components 304 to 312 is typically connected to one or more of the other devices via a bus 314 that in turn can consist of data, address, and control buses. Numerous other devices can be employed as part of the computer system 300 including video capture cards, scanners, sound cards, for example. Such devices can be used to obtain video and image data for use by the system of FIG. 1.

The video interface 310 is connected to the video display 316 and provides video signals from the computer 302 for display on the video display 316. User input to operate the computer 302 can be provided by one or more input devices via the interface 308B. For example, an operator can use the keyboard 318 and/or a pointing device such as the mouse 320 to provide input to the computer 302.

The system 300 is simply provided for illustrative purposes and other configurations can be employed without departing from the scope and spirit of the invention. Computers with which the embodiment can be practised include IBM-PC/ATs or compatibles, one of the Macintosh (TM) family of PCs, Sun Sparcstation (TM), a workstation or the like. Many such computers use graphical operating systems such as Microsoft Windows 95 and 98, for example. The foregoing is merely exemplary of the types of computers with which the embodiments of the invention may be practised. Typically, the processes of the embodiments are resident as software or a program recorded on a hard disk drive (generally depicted as block 312 in FIG. 3) as the computer readable medium, and read and controlled using the processor 304. Intermediate storage of the program and pixel data and any data fetched from the network may be accomplished using the semiconductor memory 306, possibly in concert with the hard disk drive 312.

In some instances, the program may be supplied to the user encoded on a CD-ROM or a floppy disk (both generally depicted by block 312), or alternatively could be read by the user from the network via a modem device connected to the computer, for example. Still further, the software can also be loaded into the computer system 300 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on web sites and the like. The foregoing is merely exemplary of relevant computer readable mediums. Other computer readable mediums may be practised without departing from the scope and spirit of the invention.

Thus, a method, an apparatus, and a computer program product for indexing image data in a database using visual keywords have been described. Also, a method, an apparatus, and a computer program product for retrieving image data from a database using visual keywords are also described. While only a small number of embodiments have been described, it will be obvious to those skilled in the art, in view of the disclosure herein, that changes and/or modifications can be practised with respect to those embodiments without departing from the scope and spirit of the invention. For example, the invention may be practised with differently sized images, matrices and vectors.

What is claimed is:

1. A method of indexing and retrieving a visual document using visual keywords, said method including the steps of:
   providing a plurality of visual keywords derived using a learning technique from a plurality of visual tokens extracted across a predetermined number of visual elements; each said visual token being a coherent unit of the visual document, and representing a visual content domain,
   comparing a plurality of visual tokens of another visual document with said visual keywords, a comparison result being represented by a three-dimensional map of detected locations of said visual keywords; and
   determining a spatial distribution of visual keywords dependent upon said comparison result to provide a visual-content signature for said visual document.

2. The method according to claim 1, further including the step of comparing two visual documents by matching said visual-content signatures of said visual documents.

3. The method according to claim 2, wherein said comparing step involves use of one or more predetermined similarity measures.

4. The method according to claim 1, wherein said visual content signature is a spatial aggregation map.

5. The method according to claim 1, further including the step of coding said visual-content signature to reduce the dimensionality of said visual-content signature to provide a coded description of said visual document.

6. The method according to claim 5, further including the step of comparing two visual documents by matching said coded descriptions.

7. The method according to claim 1, further including the step of extracting a plurality of visual tokens from the content of one or more visual documents, each visual token being represented by one or more predefined visual characteristics.

8. The method according to claim 7, wherein said extracting step is dependent upon predefined receptive fields and displacements.

9. The method according to claim 8, wherein said predefined receptive fields have a predetermined size.

10. The method according to claim 8, wherein said displacements have predetermined sizes.

11. The method according to claim 8, wherein two or more of said predefined receptive fields have different sizes.

12. The method according to claim 7, further including the step of generating said visual keywords using said learning technique from said visual tokens extracted across said predetermined number of said visual documents.

13. The method according to claim 12, wherein said learning technique is a supervised and/or unsupervised learning technique.

14. The method according to claim 1, further including the step of representing the outcome of said visual-token comparing step by a vector of real values, each corresponding to a visual keyword, to provide said three-dimensional map of said detected locations of said visual keywords.

15. The method according to claim 14, wherein said three-dimensional map is a type evaluation map.

16. The method according to claim 1, wherein said extracting step utilises a plurality of predefined receptive fields and displacements in horizontal and vertical directions to tessellate the two-dimensional visual content of said visual documents.

17. The method according to claim 16, wherein said extracting step includes the step of transforming a visual token, being the part of said visual content covered by a receptive field, into a vector of real values representing one or more visual characteristics of said visual token.

18. The method according to claim 12, wherein said generating step utilises a plurality of view-based recognisers and a supervised learning technique to train said view-based recognisers from positive and negative visual tokens of a view of an object, said trained view-based recognisers being said visual keywords.

19. The method according to claim 12, wherein said generating step utilises a plurality of cluster-based parameters and an unsupervised learning technique to modify said cluster-based parameters using a collection of said visual tokens, said trained cluster-based parameters being said visual keywords.

20. The method according to claim 12, wherein said comparing step further includes the step of estimating a confidence factor or set membership of said visual token to each of said visual keywords.

21. The method according to claim 20, wherein said comparing step further includes the step of iteratively computing said confidence factor or set membership for each of said visual tokens in a given visual content, resulting in said three-dimensional map of detected locations of said visual keywords.

22. The method according to claim 20, wherein said determining step includes the step of summarising said confidence factors or set memberships of said three-dimensional map of detected locations to provide a three-dimensional map regarding occurrences of said visual keywords.

23. The method according to claim 5, wherein said coding step utilises a singular-value decomposition transform to represent a matrix X formed by concatenating linearised visual content signatures of visual documents as column vectors such that $X=USV^T$ of rank r and obtains an approximate representation $X_k=U_k S_k V_k^T$ of rank k, where $k \leq r$.

24. The method according to claim 23, further including the step of transforming a visual content signature of a visual document D to generate a coded description D' as $D'=D^T U_k S_k^{-1}$.

25. The method according to claim 3, wherein a plurality of similarity matching functions are used, each for comparing the similarity between the visual-content signatures of two visual documents.

26. The method according to claim 25, further including the step of determining which similarity measure, among those produced by said plurality of similarity matching functions on pairs of said visual content signatures of said two visual documents, to use as a final similarity measure between said two visual documents.

27. An apparatus for indexing and retrieving a visual document using visual keywords, said apparatus including:
   means for providing a plurality of visual keywords derived using a learning technique from a plurality of visual tokens extracted across a predetermined number of visual documents; each said visual token being a coherent unit of the visual document, and representing a visual content domain,
   means for comparing a plurality of visual tokens of another visual document with said visual keywords, a comparison result being represented by a three-dimensional map of detected locations of said visual keywords; and
   means for determining a spatial distribution of visual keywords dependent upon said comparison result to provide a visual-content signature for said visual document.

28. The apparatus according to claim 27, further including means for comparing two visual documents by matching said visual-content signatures of said visual documents.

29. The apparatus according to claim 28, wherein said comparing means uses one or more predetermined similarity measures.

30. The apparatus according to claim 27, wherein said visual content signature is a spatial aggregation map.

31. The apparatus according to claim 27, further including means for coding said visual-content signature to reduce the dimensionality of said visual-content signature to provide a coded description of said visual document.

32. The apparatus according to claim 31, further including means for comparing two visual documents by matching said coded descriptions.

33. The apparatus according to claims 27, further including means for extracting a plurality of visual tokens from the content of one or more visual documents, each visual token being represented by one or more predefined visual characteristics.

34. The apparatus according to claim 33, wherein said extracting means is dependent upon predefined receptive fields and displacements.

35. The apparatus according to claim 34, wherein said predefined receptive fields have a predetermined size.

36. The apparatus according to claim 34, wherein said displacements have predetermined sizes.

37. The apparatus according to claim 34, wherein two or more of said predefined receptive fields have different sizes.

38. The apparatus according to claim 33, further including means for generating said visual keywords using said learning technique from said visual tokens extracted across said predetermined number of said visual documents.

39. The apparatus according to claim 38, wherein said learning technique is a supervised and/or unsupervised learning technique.

40. The apparatus according to claim 27, further including means for representing the output of said visual-token comparing means by a vector of real values, each corresponding to a visual keyword, to provide said three-dimensional map of said detected locations of said visual keywords.

41. The apparatus according to claim 40, wherein said three-dimensional map is a type evaluation map.

42. The apparatus according to claim 27, wherein said extracting means utilises a plurality of predefined receptive fields and displacements in horizontal and vertical directions to tessellate the two-dimensional visual content of said visual documents.

43. The apparatus according to claim 42, wherein said extracting means includes means for transforming a visual token, being the part of said visual content covered by a receptive field, into a vector of real values representing one or more visual characteristics of said visual token.

44. The apparatus according to claim 38, wherein said generating means utilises a plurality of view-based recognisers and a supervised learning technique to train said view-based recognisers from positive and negative visual tokens of a view of an object, said trained view-based recognisers being said visual keywords.

45. The apparatus according to claim 38, wherein said generating means utilises a plurality of cluster-based parameters and an unsupervised learning technique to modify said cluster-based parameters using a collection of said visual tokens, said trained cluster-based parameters being said visual keywords.

46. The apparatus according to claim 38, wherein said comparing means further includes means for estimating a confidence factor or set membership of said visual token to each of said visual keywords.

47. The apparatus according to claim 46, wherein said comparing means further includes means for iteratively computing said confidence factor or set membership for each of said visual tokens in a given visual content, resulting in said three-dimensional map of detected locations of said visual keywords.

48. The apparatus according to claim 46, wherein said determining means includes means for summarising said confidence factors or set memberships of said three-dimensional map of detected locations to provide a three-dimensional map regarding occurrences of said visual keywords.

49. The apparatus according to claim 31, wherein said coding means utilises a singular-value decomposition transform to represent a matrix X formed by concatenating linearised visual content signatures of visual documents as column vectors such that $X=USV^T$ of rank r and obtains an approximate representation $X_k=U_k S_k V_k^T$ of rank k, where $k \leq r$.

50. The apparatus according to claim 49, further means for transforming a visual content signature of a visual document D to generate a coded description D' as $D'=D^T U_k S_k^{-1}$.

51. The apparatus according to claim 29, wherein a plurality of similarity matching functions are used, each for comparing the similarity between the visual-content signatures of two visual documents.

52. The apparatus according to claim 51, further including means for determining which similarity measure, among those produced by said plurality of similarity matching functions on pairs of said visual content signatures of said two visual documents, to use as a final similarity measure between said two visual documents.

53. A computer program product having a computer readable medium having a computer program recorded thereon for indexing and retrieving a visual document using visual keywords, said computer program product including:
  means for providing a plurality of visual keywords derived using a learning technique from a plurality of visual tokens extracted across a predetermined number of visual documents; each said visual token being a coherent unit of the visual document, and representing a visual content domain,
  means for comparing a plurality of visual tokens of another visual document with said visual keywords, a comparison result being represented by three-dimensional map of detected locations of said visual keywords; and
  means for determining a spatial distribution of visual keywords dependent upon said comparison result to provide a visual-content signature for said visual document.

54. The computer program product according to claim 53, further including means for comparing two visual documents by matching said visual-content signatures of said visual documents.

55. The computer program product according to claim 54, wherein said comparing means uses one or more predetermined similarity measures.

56. The computer program product according to claim 53, wherein said visual content signature is a spatial aggregation map.

57. The computer program product according to claim 53, further including means for coding said visual-content signature to reduce the dimensionality of said visual-content signature to provide a coded description of said visual document.

58. The computer program product according to claim 57, further including means for comparing two visual documents by matching said coded descriptions.

59. The computer program product according to claim 53, further including means for extracting a plurality of visual tokens from the content of one or more visual documents, each visual token being represented by one or more predefined visual characteristics.

60. The computer program product according to claim 59, wherein said extracting means is dependent upon predefined receptive fields and displacements.

61. The computer program product according to claim 60, wherein said predefined receptive fields have a predetermined size.

62. The computer program product according to claim 60, wherein said displacements have predetermined sizes.

63. The computer program product according to claim 60, wherein two or more of said predefined receptive fields have different sizes.

64. The computer program product according to claim 59, further including means for generating said visual keywords using said learning technique from said visual tokens extracted across said predetermined number of said visual documents.

65. The computer program product according to claim 64, wherein said learning technique is a supervised and/or unsupervised learning technique.

66. The computer program product according to claim 53, further including means for representing the output of said visual-token comparing means by a vector of real values, each corresponding to a visual keyword, to provide said three-dimensional map of said detected locations of said visual keywords.

67. The computer program product according to claim 66, wherein said three-dimensional map is a type evaluation map.

68. The computer program product according to claim 53, wherein said extracting means utilises a plurality of predefined receptive fields and displacements in horizontal and vertical directions to tessellate the two-dimensional visual content of said visual documents.

69. The computer program product according to claim 68, wherein said extracting means includes means for transforming a visual token, being the part of said visual content covered by a receptive field, into a vector of real values representing one or more visual characteristics of said visual token.

70. The computer program product according to claim 64, wherein said generating means utilises a plurality of view-based recognisers and a supervised learning technique to train said view-based recognisers from positive and negative visual tokens of a view of an object, said trained view-based recognisers being said visual keywords.

71. The computer program product according to claim 64, wherein said generating means utilises a plurality of cluster-based parameters and an unsupervised learning technique to modify said cluster-based parameters using a collection of said visual tokens, said trained cluster-based parameters being said visual keywords.

72. The computer program product according to claim 64, wherein said comparing means further includes means for estimating a confidence factor or set membership of said visual token to each of said visual keywords.

73. The computer program product according to claim 72, wherein said comparing means further includes means for iteratively computing said confidence factor or set membership for each of said visual tokens in a given visual content, resulting in said three-dimensional map of detected locations of said visual keywords.

74. The computer program product according to claim 72, wherein said determining means includes means for summarising said confidence factors or set memberships of said three-dimensional map of detected locations to provide a three-dimensional map regarding occurrences of said visual keywords.

75. The computer program product according to claim 57, wherein said coding means utilises a singular-value decomposition transform to represent a matrix X formed by concatenating linearised visual content signatures of visual documents as column vectors such that $X=USV^T$ of rank r and obtains an approximate representation $X_k=U_k S_k V_k^T$ of rank k, where $k \leq r$.

76. The computer program product according to claim 75, further means for transforming a visual content signature of a visual document D to generate a coded description D' as $D'D^T U_k S_k^{-1}$.

77. The computer program product according to claim 55, wherein a plurality of similarity matching functions are used, each for comparing the similarity between the visual-content signatures of two visual documents.

78. The computer program product according to claim 77, further including means for determining which similarity measure, among those produced by said plurality of similarity matching functions on pairs of said visual content signatures of said two visual documents, to use as a final similarity measure between said two visual documents.

* * * * *